US011115523B2

(12) United States Patent
Clay

(10) Patent No.: US 11,115,523 B2
(45) Date of Patent: Sep. 7, 2021

(54) METHOD FOR SELECTIVELY ACCEPTING PHONE CALLS AND TEXT MESSAGES

(71) Applicant: George Forsythe Clay, Gibsonia, PA (US)

(72) Inventor: George Forsythe Clay, Gibsonia, PA (US)

( * ) Notice: Subject to any disclaimer, the term of this patent is extended or adjusted under 35 U.S.C. 154(b) by 0 days.

(21) Appl. No.: 16/975,787

(22) PCT Filed: Apr. 29, 2020

(86) PCT No.: PCT/US2020/030425
§ 371 (c)(1),
(2) Date: Aug. 26, 2020

(87) PCT Pub. No.: WO2020/223320
PCT Pub. Date: Nov. 5, 2020

(65) Prior Publication Data
US 2021/0136197 A1     May 6, 2021

Related U.S. Application Data

(60) Provisional application No. 62/840,439, filed on Apr. 30, 2019.

(51) Int. Cl.
*H04M 3/42*     (2006.01)
*H04M 3/436*    (2006.01)

(52) U.S. Cl.
CPC ..... *H04M 3/42059* (2013.01); *H04M 3/4365* (2013.01); *H04M 2203/2011* (2013.01)

(58) Field of Classification Search
CPC .......... H04M 3/42059; H04M 3/4365; H04M 2203/2011
See application file for complete search history.

(56) References Cited

U.S. PATENT DOCUMENTS 7,649,987 B1 *  1/2010  Contractor .............. H04M 3/54
                                            379/221.02
8,340,645 B2 * 12/2012  Baldwin ............... H04M 3/493
                                                455/413
9,277,049 B1 *  3/2016  Danis ...................... H04M 3/54
(Continued)

FOREIGN PATENT DOCUMENTS

JP    2007219681 A  *  8/2007
JP    2007219681 A     8/2007
WO    2017176235 A1  10/2017

*Primary Examiner* — Lisa Hashem
(74) *Attorney, Agent, or Firm* — The Webb Law Firm

(57) ABSTRACT

In a method for selectively authorizing calls and text messages, it is determined if an identification code, such as CallerID or phone number, included with a call or text from a remote phone is also included in a table or list of identification codes accessible to a user phone. In the event of no match, a user notification means of the user phone is not activated and a prompt is sent to the remote phone requesting entry of a passcode into the remote phone. Upon receipt of the passcode entered into remote phone at the user phone, it is determined if the received passcode is also included in a table or list of passcodes accessible to a user phone. In the event of a match, the user notification means of the user phone is activated. Otherwise, the user notification means of the user phone is not activated.

19 Claims, 10 Drawing Sheets

(56) References Cited

U.S. PATENT DOCUMENTS

| | | | |
|---|---|---|---|
| 2004/0034694 A1* | 2/2004 | Brown | G06Q 10/107 |
| | | | 709/207 |
| 2004/0151300 A1* | 8/2004 | Marwell | H04M 3/4933 |
| | | | 379/265.13 |
| 2004/0208304 A1* | 10/2004 | Miller | H04M 1/677 |
| | | | 379/210.02 |
| 2010/0074420 A1* | 3/2010 | Bauchot | H04M 1/663 |
| | | | 379/88.02 |
| 2012/0039452 A1* | 2/2012 | Horn | H04M 3/436 |
| | | | 379/188 |
| 2019/0132448 A1* | 5/2019 | Hengsterman | H04M 3/4938 |

\* cited by examiner

Fig. 3

Category List

| Category ID | Caller Category | Start Restriction | End Restriction | Auth? |
|---|---|---|---|---|
| 1 | VIP | | | 1 |
| 5 | Polo Team | 22:00:00 | 07:00:00 | 0 |
| 7 | MENSA | 22:00:00 | 07:00:00 | 1 |
| 12 | Work Assoc. | 22:00:00 | 07:00:00 | 0 |

Fig. 4

Password List

| Password | Description | Start Restriction | End Restriction | Auth? |
|---|---|---|---|---|
| 7 | FedEx Delivery Driver | | | 1 |
| 993 | From Business Card | 23:00:00 | 07:00:00 | 0 |
| 7711832 | Craigslist – Drum Set | 23:00:00 | 07:00:00 | 0 |
| 4122796809 | Autogenerated key | 23:00:00 | 07:00:00 | 1 |
| ... | ... | ... | ... | ... |
| 9784628398 | Autogenerated key | ... | ... | 1 |

Fig. 5

Configuration Setup Table (The Values herein are the default values)

| Parameter Name | Value | Description |
|---|---|---|
| Block_Anon | No | Block all Anonymous Callers |
| Block_Anon_VM | No | Block Voicemails from Anonymous Callers |
| Block_Anon_Texts | No | Block Texts from Anonymous Texters |
| Block_Anon_Password | No | Block password entry for Anonymous Callers |
| Bad_Password_Limit | 5 | Max bad passwords entered before Blocking |
| Log_Anon_Texts | Yes | If Block_Anon=Yes, still log Anonymous Texts |
| Log_Blocked_Texts | Yes | If Caller ID Blocked, still log texts from these |
| Maximum_Logs_Kept | 30 | Maximum age (days) of log file entries |
| Active_Contact_List | 1 | Contact List used in acceptance algorithm? |
| Active_Wildcard_List | 1 | Wildcard List used in acceptance algorithm? |
| Active_Previously_Dialed_List | 1 | "Previously Dialed" List used in acceptance algorithm? |
| Active_Entered_Password_List | 1 | "Entered Password" List used in acceptance algorithm? |
| Active_Password_List | 1 | Password List used in acceptance algorithm? |

Fig. 6

Block Table (e.g., for blocking hackers by Caller ID)

| Caller ID / Phone# | Date/Time Blocked | Description |
|---|---|---|
| 4122791133 | 08/16/2018 13:13:19 | On installation, block my number |
| 2155830135 | 01/14/2019 22:45:43 | Manual Block by user |
| 2534466762 | 04/11/2019 12:15:01 | Auto-block by Method |

Fig. 7

Contact Data Table (partial field list)

| Contact ID | First Name | Last Name | Start Restriction | End Restriction | Auth[1]? |
|---|---|---|---|---|---|
| 23 | John | Quigly | | | 1 |
| 881 | Sally | Bentoweicz | 23:00:00 | 07:00:00 | 0 |
| 1621 | Amahl | Szchakrefte | | | 0 |
| 1811 | Australian | Gourmet | | | 1 |

Fig. 8

Call Log Table

| Date/Time | Caller ID / Phone# | Call Length | Auth? | Voicemail? |
|---|---|---|---|---|
| 04/16/2019 06:29:11 | 4122796809 | 0:34 | 0 | 1 |
| 04/17/2019 08:12:12 | 9142728833 | 1:55 | 1 | 1 |
| 04/17/2019 18:22:15 | 6781213331 | 15:01 | 1 | 0 |

Fig. 9

Text Log

| Date/Time | Caller ID / Phone# | Status | Message Text |
|---|---|---|---|
| 04/16/2019 07:29:11 | 4122796809 | Authorized | Hi Jim, this is Wanda |
| 04/17/2019 09:12:12 | 9142728833 | Blocked | Jim, this is the Canadian Pharmacy calling to sell you pills. |
| 04/17/2019 11:22:15 | 6781213331 | Anonymous | Hi Jim, this is Lud – my phone calls are always anonymous, sorry. |

---

[1] "Auth" = Authorization

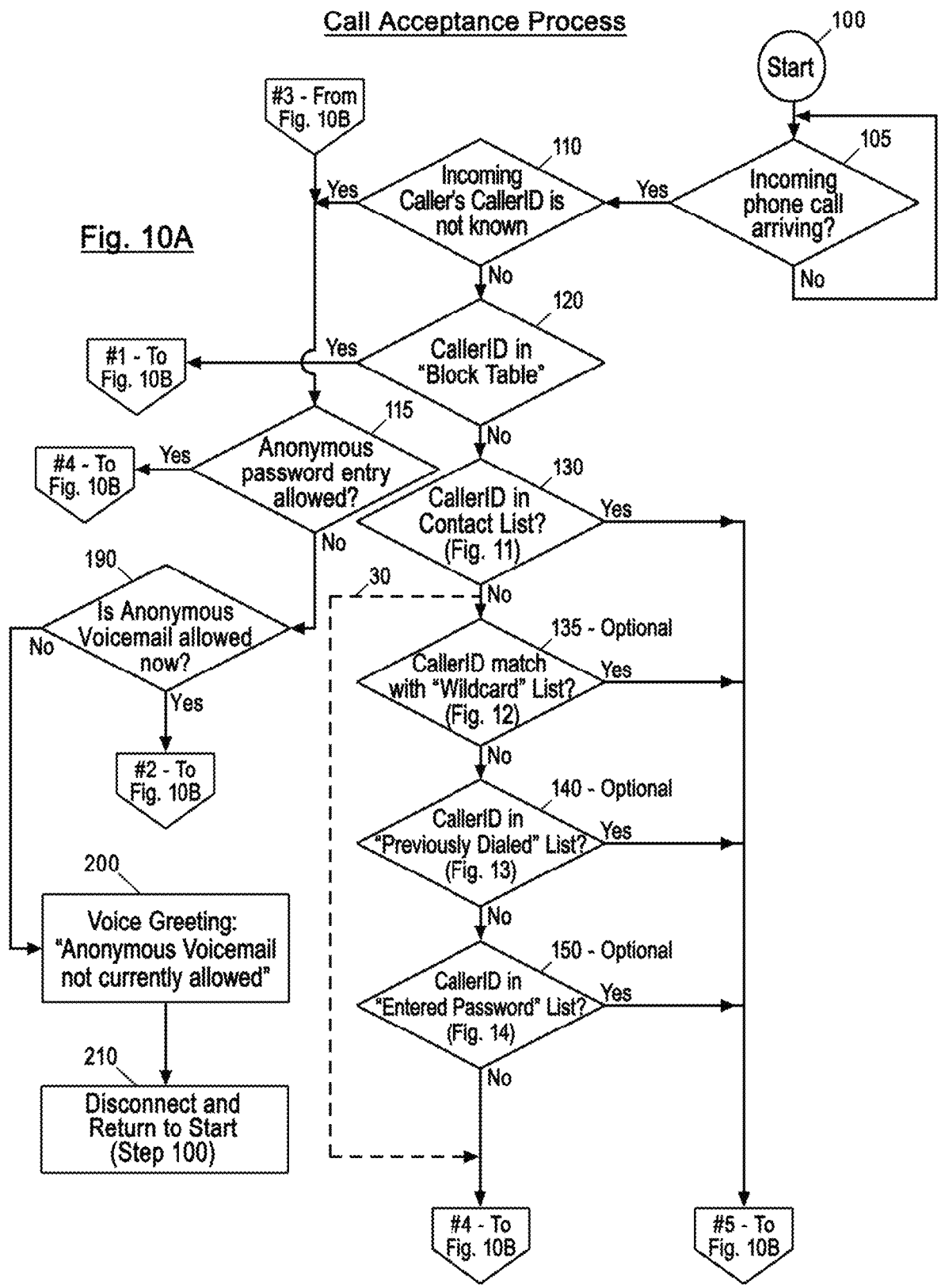

Fig. 11
Contact List or Contact Phone Table

| Contact ID | Caller ID / Phone# | Phone Type | Invalid PASSWORD Counter |
|---|---|---|---|
| 23 | 4122231113 | Mobile | 0 |
| 23 | 7813341232 | Home | 0 |
| 881 | 9142728833 | Mobile | 0 |
| 1621 | 6781213331 | Home | 0 |
| 1621 | 4122236809 | Work | 0 |
| 1811 | 011613969454500 | Work | 0 |
| 9229 | 4128871213 | Mobile | 0 |
| 100001 | 9788644101 | BadPASSWORD | 1 |
| 100002 | Unknown | Unknown | 4 |

Fig. 12
Wildcard List

| Wildcard | Description | Auth? |
|---|---|---|
| 412942* | St. Clair Hospital | 1 |
| 808* | Hawaii | 0 |

Fig. 13
Previously Dialed List

| Caller ID / Phone# | Description | Date last called | Auth? |
|---|---|---|---|
| 7244491137 | GUIdesign, LLC | 04/16/2019 07:29:11 | 1 |
| 8081224199 | Unknown | 02/11/2020 08:04:00 | 0 |

Fig. 14

Entered Password List

| Caller ID / Phone# | Caller ID Name | Date password entered |
|---|---|---|
| 3236458129 | Unknown | 01/16/2020 07:07:16 |
| 4126385045 | John Lankford | 02/09/2020 08:23:01 |

Fig. 15

Contact Category Table

| Contact ID | Category ID |
|---|---|
| 23 | 1 |
| 44 | 7 |
| 881 | 1 |
| 881 | 5 |
| 881 | 12 |

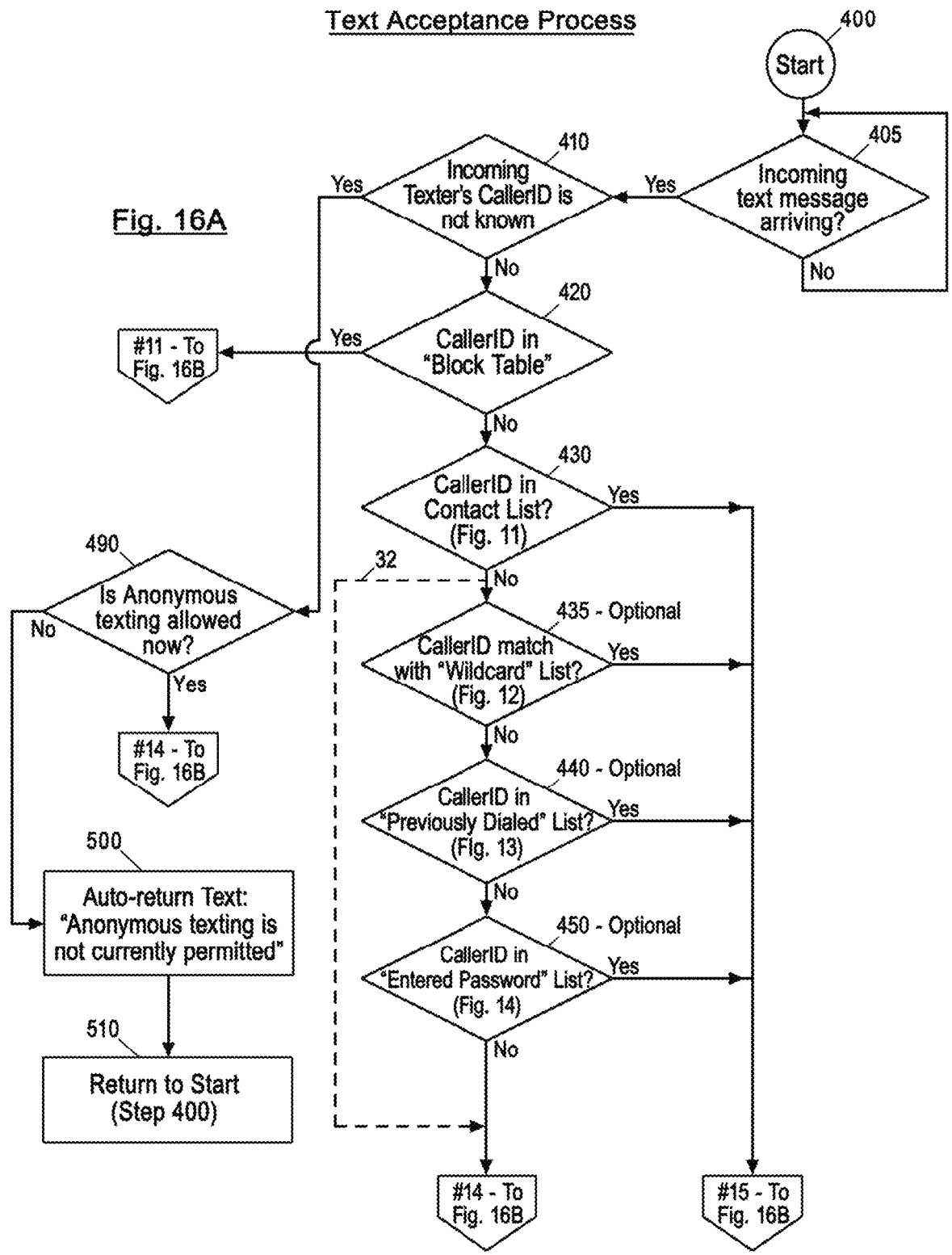

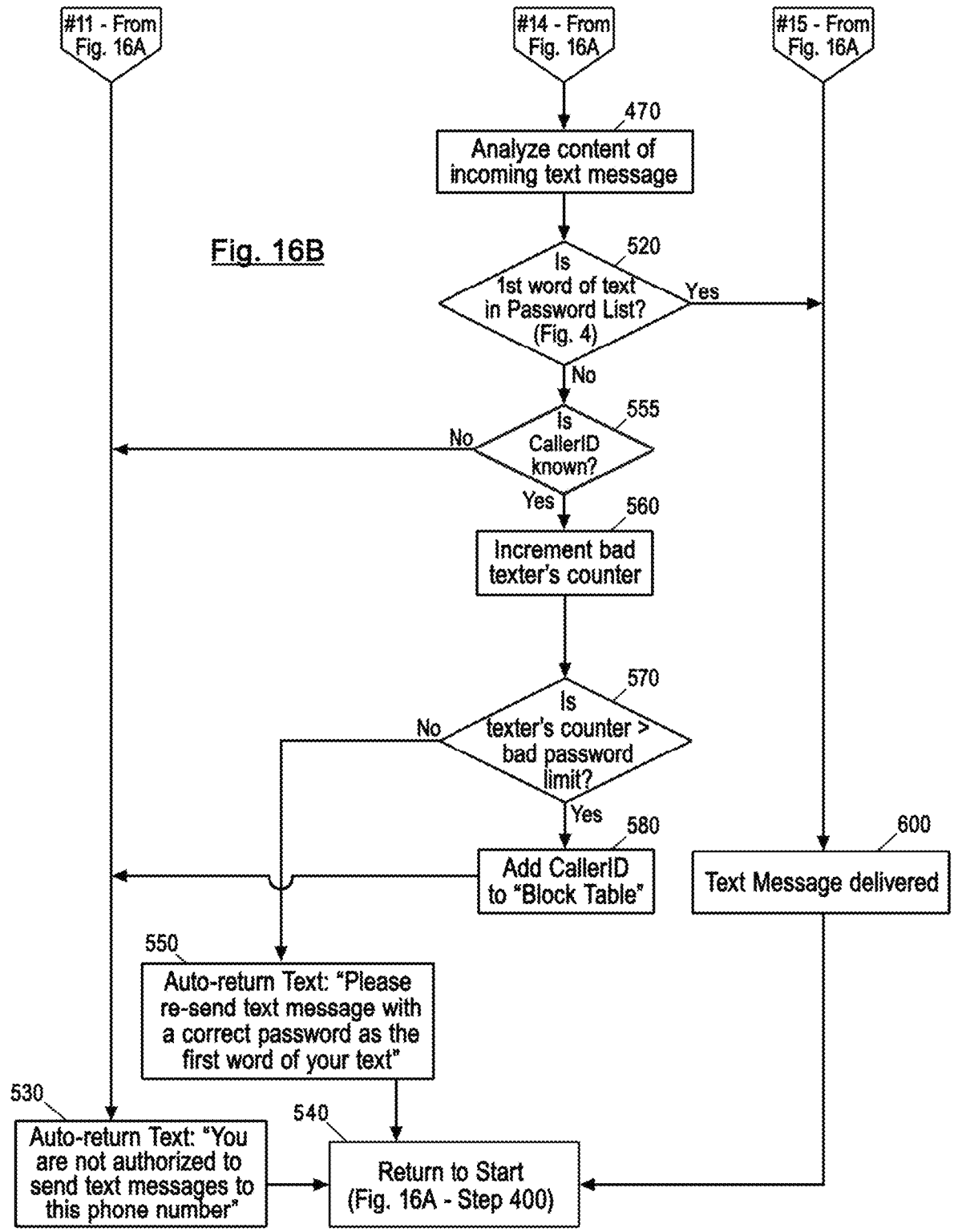

METHOD FOR SELECTIVELY ACCEPTING PHONE CALLS AND TEXT MESSAGES

CROSS REFERENCE TO RELATED APPLICATIONS

This application is the United States national phase of International Application No. PCT/US2020/030425 filed Apr. 29, 2020, and claims priority to U.S. Provisional Patent Application No. 62/840,439 filed Apr. 30, 2019, the disclosures of which are hereby incorporated by reference in their entirety.

BACKGROUND OF THE INVENTION

Field of the Invention

The present invention relates to telephone or phone call (hereinafter sometimes referred to as "call" or "calls") and text message handling and, more particularly, to avoiding unwanted incoming calls or text messages from being received and/or from activating a user notification means (e.g., a sound alert, and/or a vibration, and/or a display on a display means) of a phone, albeit a landline phone, an internet phone implemented on a computer or standalone internet enabled phone device, or a smartphone, e.g., a cellular phone.

Description of Related Art

Heretofore, unwanted phones calls and text messages have increased to the point where many users will not answer their phone or respond to a text message if they don't recognize the CallerID of the incoming call. The advent of CallerID "spoofing" technology, which presents a false CallerID to the user, and robocalls, which automate the telemarketing process, has created the need for technology to avoid or eliminate these unwanted phone calls.

In general, systems that provide "call blocking" capabilities today utilize blacklists to block, or avoid unwanted phone calls from activating the phone's user notification means, e.g., the phone's audio (ringer) function, the phone's vibrator function, the phone's display, or some combination thereof. In general, a blacklist includes one or more phone numbers that are not permitted to activate the phone's user notification means.

A problem with this approach is that determining which phone numbers to block is a difficult, and at times, an impossible task. The fact that false CallerIDs may be transmitted by a caller ("CallerID Spoofing") make the population of blacklists potentially corrupt, with random innocent phone numbers (that spoofers may use to place unwanted calls) finding their way into the blacklists and potentially preventing a desired call from activating the phone's user notification means.

"Contact List Whitelisting" has been employed so that only those CallerIDs that appear in a user's phone Contact List or Contact Phone Table that may be accessible to the user's phone will activate the phone's user notification means. While this is a good first step, by itself it is too restrictive, and may prevent desired calls from activating the phone's user notification means when the CallerID or phone number of the incoming call is not in the Contact List. For example, calls from a person having the user's business card, or from a Craigslist® ad placed by the user, are both desired calls. Craigslist® is a registered trademark of Craigslist, Inc. of San Francisco, Calif.

SUMMARY OF THE INVENTION

Generally, provided, in some non-limiting embodiments or examples, is a computer implemented method for handling, by an electronic device, a telephone or phone call (hereinafter sometimes referred to as "call" or "calls") and/or an electronic message (hereinafter sometimes referred to as "text" or "text message").

In some non-limiting embodiments or examples, the electronic device may be any suitable and/or desirable call handling device, now known or hereinafter developed, that may be programmed or configured to electronically send and/or receive and process (1) a call, e.g., audible sound, for example, speech, and optionally visual data and/or (2) an electronic message to and/or from a distant or remote call/text handling device via a network, such as, for example, a wired network, a wireless network (e.g., a cellular network), or a combination of a wired and wireless network.

In some non-limiting embodiments or examples, the call handling device may be programmed or configured to process and optionally display on an optional visual display an identification code, e.g., a CallerID, a phone number, and the like, associated with, included with, or modulated on an incoming call and/or text message. Herein, "identification code", "phone number", "phone #", "CallerID", "wildcard", and like data associated with, included with, or modulated on an incoming call and/or text message may be used interchangeably.

In some non-limiting embodiments or examples, the call handling device may be a phone, for example, a landline or dedicated internet phone, an internet phone implemented on a computer, e.g., a laptop computer, or a mobile device, such as a smartphone or mobile phone. Each phone may optionally include a visual display for displaying data and/or graphics or said phone may be programmed or configured to cause information, such as, for example, data and/or graphics, to be displayed on a separate visual display. Herein, "mobile device", "phone", "smartphone" and "mobile phone" may be used interchangeably.

Hereinafter, for the purpose of description only, and not by way of limitation, the present invention may be described with reference to a smartphone that includes a visual display. However, this is not to be construed in a limiting sense since it is envisioned that the present invention may be used on any other type of call handling device, now know or hereinafter developed, that may be programmed or configured, in a manner known in the art, to electronically send and/or receive and process (1) a call, e.g., audible sound, for example, speech, and optionally, visual information, such as data and/or graphics, and/or (2) an electronic message.

Non-limiting examples of smartphones may include, without limitation, the iPhone® line of smartphones designed and marketed by Apple Inc. of Cupertino Calif. and the Galaxy® line of smartphones designed and marketed by Samsung Electronics Co., Ltd. of S. Korea. iPhone® is a registered trademark of Apple Inc. and Galaxy® is registered trademark of Samsung Electronics Co., Ltd.

Further preferred and non-limiting embodiments or examples are set forth in the following numbered clauses.

Clause 1: A method comprising (a) receiving, by a first call handling device, via a service provider, a call including an identification code associated with a second call handling device initiating the call, wherein each call handling device includes one or more processors and memory; (b) determining, by the first call handling device, if there is a match between the identification code included with the call and a previously recorded identification code available to the first call handling device; (c) in response to determining no match in step (b), causing the first call handling device to not activate a user notification means of the first call handling device and causing the second call handling device to receive an audio prompt requesting entry of a passcode into the second call handling device; (d) receiving, by the first call handling device, the passcode entered into the second call handling device in response to step (c); (e) determining, by the first call handling device, if there is a match between the passcode received in step (d) and a previously recorded passcode available to the first call handling device; and (f) in response to determining a match in step (e), the first call handling device activating the user notification means of the first call handling device.

Clause 2. The method of clause 1, wherein steps performed by first call handling device are performed automatically by the first call handling device without input into the first call handling device by a user of the first call handling device.

Clause 3. The method of clause 1 or 2, further including: (g) in response to a user not answering the call in response to the activation of the user notification means in step (f), causing the second call handling device to receive a prompt to leave a voicemail.

Clause 4. The method of any one of clauses 1-3, further including: (h) in response to the prompt in step (g), the second call handling device receiving the voicemail; and (i) storing the voicemail received in step (h).

Clause 5. The method of any one of clauses 1-4, wherein the voicemail of step (i) is stored at the service provider.

Clause 6. The method of any one of clauses 1-5, wherein the previously recorded identification code available to the first call handling device in step (b) is stored in the memory of the first call handling device.

Clause 7. The method of any one of clauses 1-6, wherein the previously recorded identification code available to the first call handling device in step (b) is stored at the service provider.

Clause 8. The method of any one of clauses 1-7, wherein the previously recorded passcode available to the first call handling device in step (e) is stored in the memory of the first call handling device.

Clause 9. The method of any one of clauses 1-8, wherein the previously recorded passcode available to the first call handling device in step (e) is stored at the service provider.

Clause 10. The method of any one of clauses 1-9, wherein each call handling device is a cellular telephone, a smartphone, or a Voice-Over-IP (VOIP) phone.

Clause 11. The method of any one of clauses 1-10, wherein the user notification means of the first call handling device is an audio speaker, a vibrator, or both.

Clause 12. A method comprising: (a) receiving, by a first text message handling device via a service provider, a first text message including an identification code (CallerID/Phone #) associated with a second text message handling device initiating the first text message, wherein each text message handling device includes one or more processors and memory; (b) determining, by the first text message handling device, if there is a match between the identification code included with the first text message and a previously recorded identification code available to the first text message handling device; (c) in response to determining no match in step (b), causing the first text message handling device to not display the first text message and causing the second text message handling device to receive a second text message requesting inclusion of a passcode in the first text message; (d) receiving, by the first text message handling device from the second text message handling device, a third text message including the first text message and the passcode entered at the second message text handling device in response to step (c); (e) determining, by the first text message handling device, if there is a match between the passcode included in third text message received in step (d) and a previously recorded passcode available to the first text message handling device; and (f) in response to determining a match in step (e), the first text message handling device causing the third text message to be displayed on a display.

Clause 13. The method of clause 12, wherein steps performed by first text handling device are performed automatically by the first text handling device without input into the first text handling device by a user of the first text handling device.

Clause 14. The method of clause 12 or 13, wherein the previously recorded identification code available to the first text handling device in step (b) is stored in the memory of the first text handling device.

Clause 15. The method of any one of clauses 12-14, wherein the identification code available to the first text handling device in step (b) is stored at the service provider.

Clause 16. The method of any one of clauses 12-15, wherein the previously recorded passcode available to the first text handling device in step (e) is stored in the memory of the first text handling device.

Clause 17. The method of any one of clauses 12-16, wherein the previously recorded passcode available to the first text handling device in step (e) is stored at the service provider.

Clause 18. The method of any one of clauses 12-17, wherein each text handling device is a cellular telephone, a smartphone, or a Voice-Over-IP (VOIP) phone.

Clause 19. The method of any one of clauses 12-18, wherein the display is part of the first text message handling device.

Clause 20. A method comprising: (a) receiving by a first electronic device from a second electronic device an electronic communication (a call or text message) having an identification code associated with, included with, or modulated on the electronic communication, wherein each electronic device includes a processor and memory and the electronic communication is transmitted via a wired, a wireless, or both a wired and a wireless communication medium; (b) determining, by the first electronic device, if there is a match between the identification code associated with, included with, or modulated on the electronic communication and a previously recorded identification code available to the first call handling device; (c) in response to determining no match in step (b), causing the first electronic device to not activate a user notification means of the first electronic device and causing the second call handling device to receive a prompt requesting entry of a passcode into the second electronic device; (d) receiving, by the first electronic device, the passcode entered into the second electronic device in response to step (c); (e) determining, by the first electronic device, if there is a match between the passcode received in step (d) and a previously recorded passcode available to the first electronic device; and (f) in response to determining a match in step (e), the first electronic device activating the user notification means of the first electronic device.

Clause 21. The method of clause 20, wherein the user notification means of the first electronic device is an audio speaker, a vibrator, or a display.

BRIEF DESCRIPTION OF THE DRAWING(S)

These and other features of the present invention will become more apparent from the following description wherein reference is made to the appended drawings wherein:

FIG. 1 is a block diagram of a non-limiting embodiment or example user smartphone in operative communication with a remote phone, such as a remote smartphone, via a non-limiting embodiment or example communication network which, in an example, is represented by a call service provider, e.g., a telephone service provider;

FIG. 2 is an example slider 20 that may be displayed on a display of the user smartphone in FIG. 1 and may include a button 22 that may be adjusted along a length 24 of slider 20 by touching and dragging to a desired position 1-7 along a length 24 of slider 20, wherein the button 22 are each position 1-7 changes exemplary function or functions that may be performed by the user smartphone;

FIG. 3 is an exemplary Category List in accordance with the principles of the present invention;

FIG. 4 is an exemplary Password List in accordance with the principles of the present invention;

FIG. 5 is an exemplary Configuration Setup Table in accordance with the principles of the present invention;

FIG. 6 is an exemplary Block Table in accordance with the principles of the present invention;

FIG. 7 is an exemplary Contact Data Table in accordance with the principles of the present invention;

FIG. 8 is an exemplary Call Log Table in accordance with the principles of the present invention;

FIG. 9 is an exemplary Text Log Table in accordance with the principles of the present invention;

FIGS. 10A-10B are a flow diagram of an exemplary Call Acceptance Process or Method in accordance with the principles of the present invention;

FIG. 11 is an exemplary Contact List or Contact Phone Table in accordance with the principles of the present invention;

FIG. 12 is an exemplary Wildcard List in accordance with the principles of the present invention;

FIG. 13 is an exemplary Previously Dialed List in accordance with the principles of the present invention;

FIG. 14 is an exemplary Entered Password List in accordance with the principles of the present invention;

FIG. 15 is an exemplary Contact Category Table in accordance with the principles of the present invention; and FIGS. 16A-16B are a flow diagram of an exemplary Text Acceptance Process or Method in accordance with the principles of the present invention.

DESCRIPTION OF THE INVENTION

Various non-limiting examples will now be described with reference to the accompanying figures where like reference numbers correspond to like or functionally equivalent elements.

Figure 1:
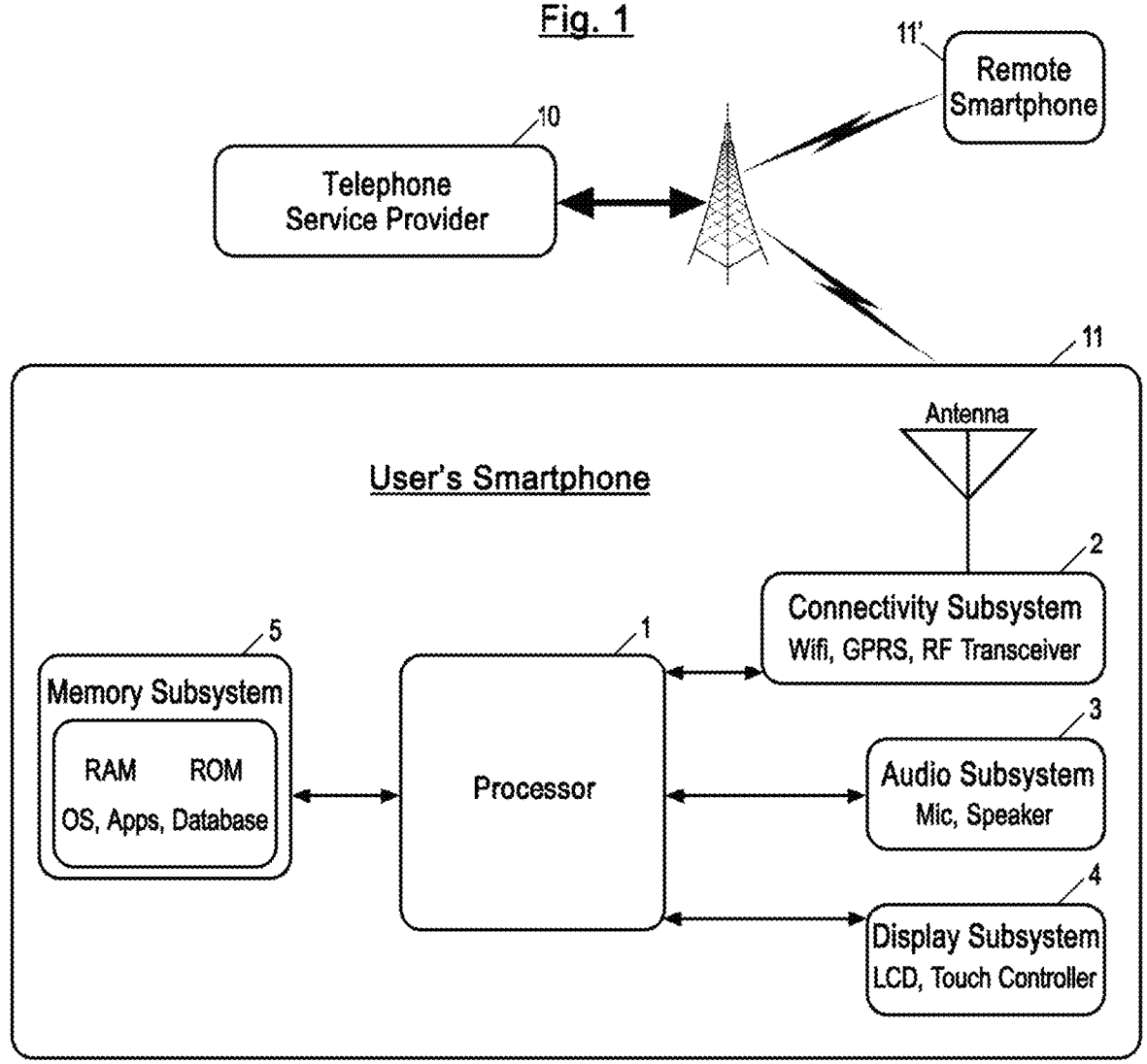

With reference to FIG. 1, in some non-limiting embodiments or examples, the method described herein allows no incoming call and/or text message to activate a user notification means of the user smartphone 11, e.g., the smartphone's audio (ringer) subsystem 3, or the phone's vibrator function, the phone's display system 4, or some combination thereof, unless the identification code, phone number, CallerID, or other information associated with, included with, or modulated on the incoming call and/or text to the user smartphone 11 matches an identification code, a phone number, CallerID, or other information included in one or more lists or tables, whereupon unwanted calls or texts may be blocked. Herein, "list(s)" and "table(s)" may be used interchangeably. Herein, "identification code", "CallerID", "phone #", "phone number" and like terms or phrases may be used interchangeably.

In some non-limiting embodiments or examples, the method(s) described herein may be embodied in a software program or application which may be stored in a memory subsystem 5 of the user smartphone 11 and which, when executed by a processor 1 of the user smartphone 11, configures the user smartphone 11 to perform the method. In some non-limiting embodiments or examples, the application may be stored in the user smartphone's 11 memory subsystem 5, may be executed only by the processor 1 of the user smartphone 11, and may operate, in the manner described hereinafter, as an interface between an incoming call and/or text, received by a connectivity subsystem 2 of the user smartphone 11, and the phone and/or text application(s). Herein, "software program" and "application" may be used interchangeably.

Herein, the terms "call", "calls", "text", "texts", and like terms may be used interchangeably. Accordingly, the description herein of the method being used in connection with a "call" or "calls" is to be understood, to the extent possible, as also applicable to "text" or "texts", and vice versa. Moreover, a "call" or "calls" is intended to include audio and, optionally, visual communication and "text" or "texts" is intended to include text message(s) known in the art.

In some non-limiting embodiments or examples, the application may be distributed between the memory subsystem 5 of the user smartphone 11 and a memory subsystem of a remote computer or server, e.g., a remote computer or server of a telephone (or internet) service provider 10, e.g., a cellular telephone service provider, with one part of the application executing by the processor 1 of the user smartphone 11 and with another, complimentary part of the application executing by a processor of the remote computer or server.

In an example, one part of the application may reside and execute on the remote server, e.g., without limitation, a server of or accessible by the telephone service provider 10, which may manage incoming calls from one or more remote smartphones 11' and determine when to allow the call to be routed to the user smartphone 11.

Herein, the telephone service provider 10 may be, for example, without limitation, a cellular telephone service provider, an internet telephone service provider, a plain old telephone service (POTS) provider, and the like, that can route calls and/or texts via a wired network, a wireless (e.g., cellular network), or the combination of the a wired and wireless network.

In an example, an incoming call from remote smartphone 11' to the user smartphone 11 may be routed through telephone service provider 10 which determines if the call is to be routed to the user smartphone 11 where the call may activate the user notification means of the user smartphone 11. If so, the telephone service provider 10 may, in an example, establish a call between the user smartphone 11 and the remote smartphone 11' initiating the call where the call may activate the user notification means of the user smartphone 11 and, upon the user accepting the call on the user smartphone 11 in a manner known in the art, complete the call connection between the user smartphone 11 and the remote smartphone 11' initiating the call.

In some non-limiting embodiments or examples, the user smartphone 11 and the remote smartphone 11' may include the same general hardware subsystems shown in connection with the user smartphone 11 in FIG. 1. Accordingly, for the purpose of simplicity, only the hardware subsystems of the user smartphone 11 are shown in FIG. 1, it being understood that remote smartphone 11' includes the same or similar hardware subsystems.

In some non-limiting embodiments or examples, the application may reside only within the remote server, e.g., a server of the cellular telephone service provider's 10, which may include one or more computers or servers where the method may be executed, and where a voicemail application may reside. In an example, the one or more lists described herein may reside on the user smartphone 11, or the remote computer or server, or the lists may be distributed between the user smartphone 11 and the remote computer or server.

In some non-limiting embodiments or examples, the application may be executed by a processor that may be connected between an incoming telephone landline and a landline telephone, with Wi-Fi, Bluetooth, or wired connections to a computer or a smartphone where the one or more lists may reside. In this example, the application executed by the processor can determine if the phone number associated with, included with, or modulated on the incoming call matches a phone number included in a list stored on the computer or smartphone.

In some non-limiting embodiments or examples, the application may default to not accepting any incoming calls or texts and may use the one or more lists to determine which calls/texts are authorized to activate the user notification means of the user smartphone 11, e.g., cause the user smartphone 11 to output or generate a sound, or a vibration, or optionally generate a display on a display of the user smartphone 11. In this manner, unwanted calls and/or texts may be blocked, yet desired calls and/or texts can be authorized by the user to activate the user notification means of the user smartphone 11 and can be delivered to the user smartphone 11 application(s) that configure the user smartphone 11 to handle incoming calls and/or texts upon the user accepting the call and/or texts in a manner known in the art.

In some non-limiting embodiments or examples, the one or more of the lists or tables described hereinafter may be used by the application that implements the method(s) of the present invention, to determine when a call and/or text is/are authorized to activate the user notification means of the user smartphone 11. The present invention may be described as an software program or application that may be installed, e.g., on user smartphone 11, the remote computer or server, or which may be installed in a distributed manner across both the user smartphone 11 and the remote computer or server, which application, when executed in a manner known in the art, configures the smartphone to operate in the manner described herein.

Password List (FIG. 4)

In some non-limiting embodiments or examples, this Password List, which may be maintained manually and/or automatically, may include password(s) or passcode(s) that are authorized to activate the user notification means of the user smartphone 11. For example, this password list may include one or more passwords associated with one or more public and/or private disclosures of the phone number associated with the smartphone. Herein, "password(s)" and "passcode(s)" may be used interchangeably.

Non-limiting examples of public disclosures of passwords may include: a business card including the phone number associated with the smartphone along with the password to be used when calling the phone number, and/or a Craigslist® ad (or other internet web page) including the phone number associated with the smartphone along with the password. Other types of public disclosures are also envisioned. Craigslist® is a registered trademark of Craigslist, Inc. of San Francisco Calif.

A non-limiting example of a private disclosure of a password may include a disclosure (oral or written) to an individual to whom was provided the phone number associated with the smartphone along with the password.

In an example, when a caller places a call via a remote smartphone 11' to the user smartphone 11, the caller may be prompted (audibly and/or visually) at the remote smartphone 11' to enter a password into the remote smartphone 11'. The password may be entered into remote smartphone 11' manually, e.g., typing, or orally for conversion thereof into letters and/or numbers via a suitable speech to text software running on the remote smartphone 11'. The thus entered password may then be dispatched from the remote smartphone 11' to the user smartphone 11 for receipt and processing thereby. Upon determining that the entered password matches a password in the Password List, the processor 1 of the user smartphone 11 may activate the user notification means of the user smartphone 11. In addition to optionally displaying the phone number or CallerID that may be received with the call, a description that may be associated with the entered password (e.g. Business Card Caller, or Craigslist® ad) may also be displayed on the display, if provided, of the user smartphone 11.

In an example, different passwords may be used for different purposes. For example, a business card (or cards) that includes the phone number associated with the smartphone may also include a first password that is associated with the business card (or cards). In another example, a Craigslist® ad that includes the phone number associated with the smartphone may include a second, different password that is associated with the ad. In yet another example, a third, different password may be associated with an oral disclosure of the phone number associated with the smartphone, e.g., a disclosure to a delivery person or repairman.

In an example, the smartphone may be programmed or configured to display on its display, if provided, a description corresponding to the received first, second, and/or third password. For example, display "Business Card Caller" when the first password is received by the user smartphone; display "Craigslist® Caller" when the second password is received by the user smartphone; and display "User Provided" when the third password is received by the user smartphone.

Entered Password List (FIG. 14)

In some non-limiting embodiments or examples, this Entered Password List, which may be maintained manually and/or automatically, can include phone number(s) associated with, included with, or modulated on one or more or all previously incoming calls and/or texts for which a password was previously entered that was included in the Password List (FIG. 4), whereupon, unless the phone number is deleted from the Entered Password List, when the user smartphone 11 receives a call including a phone number included in the Entered Password List, the call may activate the smartphone's user notification means without first prompting the remote smartphone 11' to enter a password.

Previously Dialed List (FIG. 13)

In some non-limiting embodiments or examples, this Previously Dialed List, which may be maintained manually and/or automatically, includes one or more or all phone number(s) dialed by the user smartphone 11, whereupon, unless the a phone number is deleted from the Previously Dialed List, a call received by the user smartphone 11 that includes the phone number in the Previously Dialed List may activate the user notification means of the user smartphone 11 without first prompting the remote smartphone 11' to enter a password.

Wildcard List (FIG. 12)

In some non-limiting embodiments or examples, this Wildcard List, which may be maintained manually and/or automatically, includes one or more Wildcards that may activate the user notification means of the user smartphone 11 without first prompting the remote smartphone 11' to enter a password. One non-limiting example of a Wildcard may include any phone number beginning with predetermined sequence of numbers, e.g. 412942 for all numbers calling from, for example, a business, such as, e.g., a local hospital complex, or 808 for all numbers dialing in from area code 808 (Hawaii)).

A call not satisfying at least one of these call acceptance criteria, e.g., a password included in the Password List or the Entered Password List, a phone number included in the Previously Dialed List, and/or a Wildcard included in the Wildcard List, may be routed to the voicemail application of the user smartphone 11. However, a call that satisfies at least one of these call acceptance criteria can deemed to be an authorized call and is allowed to activate the user notification means of the user smartphone 11 without first prompting the remote smartphone 11' to enter a password.

What the User of Smartphone 11 Sees When a Call Arrives:

In some non-limiting embodiments or examples, when it is determined that an authorized call has arrived at the user smartphone 11, the reason (described hereinafter) the call was allowed to cause the user notification means of the user smartphone 11 to be activated may be displayed on the display of the user smartphone 11, which display may be part of the display subsystem 4 of the user smartphone 11 shown in FIG. 1. Alternatively, the CallerID (if available) and/or the CNAM (CallerID Name, if available) may also be displayed on the display of the user smartphone 11. Reasons that may be displayed on the display of the user smartphone 11 for a call causing the user notification means of the user smartphone 11 to be activated may include one or more of the following:

For an incoming call from a phone number in a Contact List (FIG. 11) accessible to the user smartphone 11, the phone number may be displayed on the display of the user smartphone 11 in the same manner as the prior art and the name of the contact, if included in the Contact List, may be also be displayed on the display of the user smartphone 11. Also or alternatively, the reason, e.g., "From Contact List" may also be displayed on the display of the user smartphone 11.

If the incoming phone call was a phone number included in the Previously Dialed List (FIG. 13), the phone number may be displayed on the display of the user smartphone 11. Also or alternatively, the reason, e.g., "Previously Dialed" may be displayed on the display of the user smartphone 11.

If the remote smartphone 11' is, in response to placing a call to the user smartphone 11, prompted to enter a password, the string of characters and/or numbers entered into the remote smartphone 11' in response to said prompt may be displayed on the display of the user smartphone 11. Also or alternatively, the reason, e.g., "From Business Card" or "From Craigslist ad" or "From Party Invitation" may be displayed on the display of the user smartphone 11.

If a correct password was entered in response to a previous call to the user smartphone 11, said password may be displayed on the display of the user smartphone 11. Also or alternatively, the reason, e.g., "From Business Card" may be displayed on the display of the user smartphone 11.

If an incoming call included a portion of a phone number included in the "Wildcard List" (FIG. 12), said portion of the phone number may be displayed on the display of the user smartphone 11. Also or alternatively, the reason: e.g., "From St. Clair Hospital Complex", may be displayed on the display of the user smartphone 11.

List Activation

Figure 2:
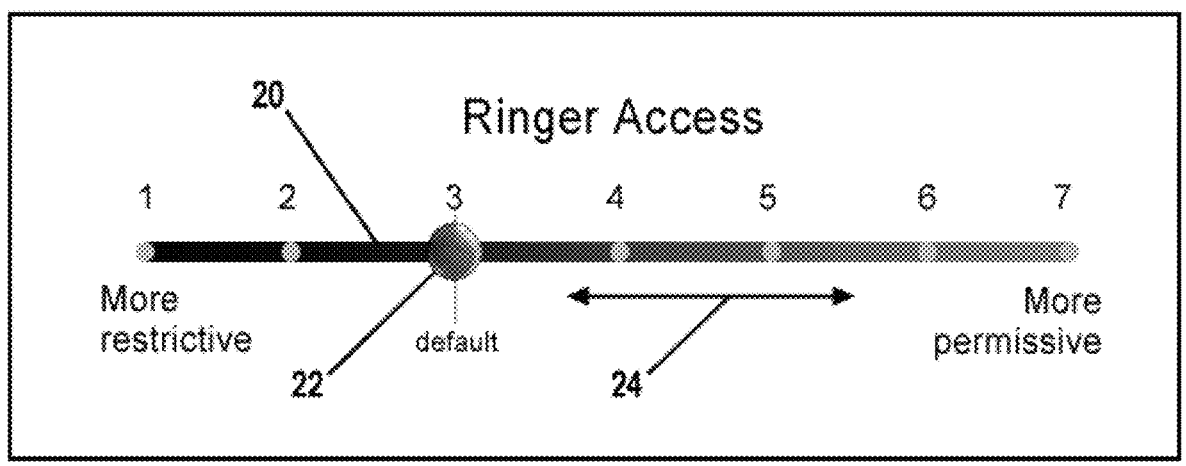

In some non-limiting embodiments or examples, the user of user smartphone 11 may govern which of the foregoing are active, i.e. govern how restrictive or permissive call acceptance occurs via, for example, slider 20 shown in FIG. 2, where the positions 1-7 of button 22, listed as 1-7 below, implement the following respective functions:

1. No phone call may activate the user notification means of the user smartphone 11;
2. Only calls from phone numbers, included in the "Contact List" (FIG. 11), that are received by the user smartphone 11 may cause the user notification means of the user smartphone 11 to be activated;
3. In addition to 2, a password, included in the "Password List" (FIG. 4), that is received by the user smartphone 11 may cause the user notification means of the user smartphone 11 to be activated;
4. In addition to 2 and 3, a wildcard, included in the "Wildcard List" (FIG. 12), that is received by the user smartphone 11 may cause the user notification means of the user smartphone 11 to be activated;
5. In addition to 2-4, a password, included in the "Entered Password List" (FIG. 14), that is received by the user smartphone 11 may cause the user notification means of the user smartphone 11 to be activated;
6. In addition to 2-5, a password, included in the "Previously Dialed List" (FIG. 13), that is received by the user smartphone 11 may cause the user notification means of the user smartphone 11 to be activated; and
7. All calls may cause the user notification means of the user smartphone 11 to be activated.

In an example, slider 20 and the manual activation of specific lists may be mutually exclusive, i.e. if button 22 is at position 3 and the user then disables the Password List by another mechanism e.g. checkboxes on a configuration screen—then button 22 at position 3 of slider 20 is no longer valid. This may also or alternatively be implemented by an 8th position of slider 20—"Custom Settings".

In some non-limiting embodiments or examples, instead of slider 20 and button 22, checkboxes (not specifically shown) may be provided to the user of user smartphone 11 (on a display of user smartphone) to select which lists (mentioned in connection with the positions 2-6 of button 22 above) are active and/or inactive. For example, each of "Contact List", "Password List", "Wildcard List", "Entered Password List", and/or "Previously Dialed List" may selected (via a checkbox or other graphical means known in the art) to be active or inactive independently of each other.

The determination whether an incoming call activates the user notification means of the user smartphone 11 may be made the application running on: the user smartphone 11, the server of the telephone service provider; or, in a distributed manner, on both the user smartphone 11 and the server of the telephone service provider, with part of the application running on the smartphone 11 and with a complimentary part of the application running on the server of the telephone service provider.

The above order of functions 1-7 and/or the functions associated with slider 20 is/are not to be construed in a limiting sense since it is envisioned that said order may be modified as desired and/or which function(s) that may be associated with each position of the button 22 of slider 20 can be modified as desired. For example, without limitation, any one or more, but not all, of function(s) 1-7 may omitted. In another example, the positions of functions 4 and 6, for example, may be reversed. Whereupon, in this example, new function 4 (previously function 6) would be "In addition to 2 and 3" vs. "2-5" and new function 6 (previously function 4) would be "In addition to 2-5" vs. "2 and 3".

In some non-limiting embodiments or examples, the user may select which individual list(s) is/are to be active. In some non-limiting embodiments or examples, a default set of lists may be active in a user selectable order or, by default, a predetermined order. In an example, the set of lists may include two or more or all of the following list in any order: Contact List (FIG. 11), Password List (FIG. 4), Wildcard List (FIG. 12), Entered Password List (FIG. 14), and Previously Dialed List (FIG. 13).

Authorization by Category

Each contact included in the Contact List (FIG. 11) may have one or more Caller Categories assigned to them in the Category List (FIG. 3). In other words, contacts in the Contact List (FIG. 11) may have one or more assigned Caller Category. For example, one contact may have "Bridge Club" assigned, another contact may have "Karaoke Buddies" assigned, and another contact may have both assigned. In accordance with the present invention, the application may be configured, e.g., by the user, to be temporarily restricted to one or more or all of such categories of contacts from causing the user notification means of the user smartphone 11 to be activated, e.g., for a certain time period.

For example, if the user is at an event, e.g. a symphony, even though the user smartphone 11 is on vibrate—the user may only want callers from a VIP Caller Category to vibrate the user smartphone 11 while they are in the audience.

Caller Authorization/Restriction by Category:

With reference to the Category List shown in FIG. 3, the application may be configured, e.g., by the user, to authorize or restrict any caller from activating the user notification means of the user smartphone 11 by individual CallerID/phone number or by a Caller Category associated with the CallerID/phone number, either until this setting is changed, or based on a recurring time schedule. In an example, the user of user smartphone 11 may access the Category List of FIG. 3, e.g., via the display (e.g., touch display) of the user smartphone 11, to configure the smartphone 11 to authorize only the "VIP" category of callers between 7 AM and 10 PM each day, for example, to cause the user notification means of the user smartphone 11 to be activated—restricting all other callers from doing so during that timeframe. For example, as shown in FIG. 3, a "Caller Category"="Polo Team" would have a "Start Restriction"="22:00:00" and an "End Restriction" of "07:00:00", during which period the user smartphone 11 would not activate the user notification means of the user smartphone 11. Other than this period, a call received by smartphone 11 from a phone number associated with the "Caller Category"="Polo Team" would be cause the user notification means of the user smartphone 11 to be activated.

In some non-limiting embodiments or examples, the user of the user smartphone 11 may have access to a selection means, e.g., a radio button menu, displayed on the display of the user smartphone 11, that may include one or more of the following selections selectable by the user that may relate, at least in part, to the Caller Category shown in the Category List of FIG. 3. In some non-limiting embodiments or examples, the selection of one of the following selections may be to the exclusion of the other selections. In other words, only one of the following selections may be selected at a time. However, it is also envisioned none of the following selections may be selected.

Authorize Everyone

VIP Only

Custom

Restrict Everyone

Cancel Category-based Authorization

Where

Authorize Everyone, if selected, may allow all incoming calls to the user smartphone 11 to activate the user notification means of the smartphone 11 exactly as it did before the application was installed. This function may be redundant with slider position 7 of slider 20 shown in FIG. 2, if provided.

VIP Only, if selected, may allow calls associated with the Caller Category (FIG. 3) VIP to activate the user notification means of the user smartphone 11, with calls associated with other Caller Categories or no Caller Category being routed to voicemail. For example, if "VIP Only" is selected and the user notification means of the user smartphone 11 was set to "vibrate", the user smartphone 11 would only vibrate if a call associated with the Caller Category (FIG. 3) VIP was received by the user smartphone 11.

Restrict Everyone, if selected, may route all calls directly to voicemail. However, unlike "airplane mode", known in the art, when Restrict Everyone is selected, calls may be initiated by the user smartphone 11. This function may be redundant with slider position 1 of slider 20 shown in FIG. 2, if provided.

Cancel Category-based Authorization, if selected, may disable use of the Category List of FIG. 3 as a means for screening incoming calls in the manner described above. If Cancel Category-based Authorization is unselected, use of the Category List of FIG. 3 is enabled.

Custom, if selected, may cause smartphone 11 to display a selection menu of currently defined Caller Category (FIG. 3) along with "Password Callers", and "Set Individual Contact Access".

Selection of "Password Callers" would open the Password List (FIG. 4) which would allow the selection of individual passwords (FIG. 4) entered into remote smartphone 11' that may be authorized to or restricted from causing the user notification means of the user smartphone 11 to be activated.

Selection of "Set Individual Contact Access" would open the Contact Data Table (FIG. 7) which would allow the selection, on a contact-by-contact basis, which contact may be authorized to or restricted from causing the user notification means of smartphone 11 to be activated, e.g., based on a phone number associated with the contact in the Contact List (FIG. 11). This "Set Individual Contact Access" enables selection of each contact that may be authorized to or restricted from causing the user notification means of smartphone 11 to be activated without having to select the phone number of said contact. The selection of each contact may be based on the selection, e.g., in the Contact Data Table of FIG. 7, of one or more of the contact's First Name, Last Name, and/or Contact ID.

Herein, any authorization to or restriction from causing the user notification means of smartphone 11 to be activated may be permanent, for a single period of time, e.g., for one day, or for one or more periods of time, e.g., a recurring time schedule.

Blacklisting by Phone Number/CallerID

Traditionally, call-blocking applications blocked calls by attempting to identify which phone number is unwanted, then placing that phone number in a "Blacklist" database.

Since CallerIDs may be "spoofed", potentially any phone number could be used to spoof a CallerID of any incoming call. This phone number could then make its way into the Blacklist and prevent legitimate numbers from causing the user notification means of the user smartphone 11 to be activated.

In an example, it is known that the user smartphone 11 may receive a call with a CallerID that matches (improperly) the CallerID associated with the user smartphone 11, i.e., spoofing. "Spoofing", in general, is a practice in which a communication, e.g., a call, is sent from an unknown source disguised as a source, e.g., using the CallerID, known to the receiver. Reasons like this are why the method described herein that uses one or more lists and/or new data, e.g., one or more passwords, for call screening is superior to the use of a Blacklist database. In some non-limiting embodiments or examples, where a number of repeated calls are made from a calling phone number including an associated CallerID to smartphone 11 and, for each call a different password is entered, e.g., in an attempt to eventually enter a valid password, the application may block calls with said CallerID after "X" failed password attempts (see e.g., FIG. 5, "Bad_Password_Limit") and said CallerID would thereafter be blocked (see FIG. 6, "Block Table") from causing the user notification means of the user smartphone 11 to be activated and, optionally, the call may be accepted, without the user notification means of the user smartphone 11 being activated, and a voice greeting, e.g., "You are not authorized to call this phone number", or some other custom greeting, may be presented to the phone, associated with the calling phone number, e.g., the remote smartphone 11'.

In this example, the user of smartphone 11 may select the value "X" to include in the "Value" field of the "Bad_Password_Limit" row of the Configuration Table of FIG. 5. The user may also add any desired phone number to the Block Table shown in FIG. 6. The user of smartphone 11 may also configure the application to set whether an unauthorized call or text would be allowed to leave a voicemail or text, for example, by the selecting the Value, "Yes" or "No" included in the Value field of each of the Block_Anon, Block_Anon_VM, and Block_Anon_Texts rows of the Configuration Table of FIG. 5. This may block a potentially large number of robo-voicemails or tests.

In some non-limiting embodiments or examples, the phone number of each incoming call may be recorded in a Call Log table (FIG. 8). In an example, the phone number of each incoming text message may be logged in a Text Log table (FIG. 9). The duration or number of days the oldest log records would be kept may be set by selecting the Value included in the field of Maximum_Logs_Kept row of the Configuration Setup table of FIG. 5.

Call Acceptance Method

A hardware block diagram of an example user smartphone 11 on which an application in accordance with the principals of the present invention may execute is shown in FIG. 1 and includes the processor 1, a memory or memory subsystem 5 which may include Read Only Memory (ROM, including, for example, flash memory) for storing the application or applications that implement the method(s) described herein, an operating system, a database which can store the lists and/or tables described herein, and Random Access Memory (RAM) where all program execution takes place. A connectivity subsystem 2 is depicted which includes means which allow all voice and data communication with a remote smartphone 11' via a telephone service provider 10, an audio subsystem 3 where the user's voice is picked up from a microphone and then converted by the processor 1 from analog signals to digital signals, and where digital signals from the processor 1 are converted to analog signals and transmitted to a speaker where the sound may be reproduced. A display subsystem 4 is depicted where graphics may be displayed on a display screen (LCD or OLED) and where touch actions by the user may converted to digital signals by a touch controller and transmitted to processor 1. Remote smartphone 11' may be the same or different than user smartphone 11.

The block diagram of user smartphone 11 shown in FIG. 1 is for illustration purposes only and is not to be construed in a limiting sense since the application may execute on any computer implemented telephony device now known or hereinafter developed. For the purpose of illustration only, the application may be described in connection with a call and/or text via a cellular network. However, this is not to be construed in a limiting sense since the application may be used with a call and/or text that uses any type or combination of transmission or communication means, e.g., a wired, or a wireless, or the combination of a wired and a wireless transmission or communication means.

Figure 10B:
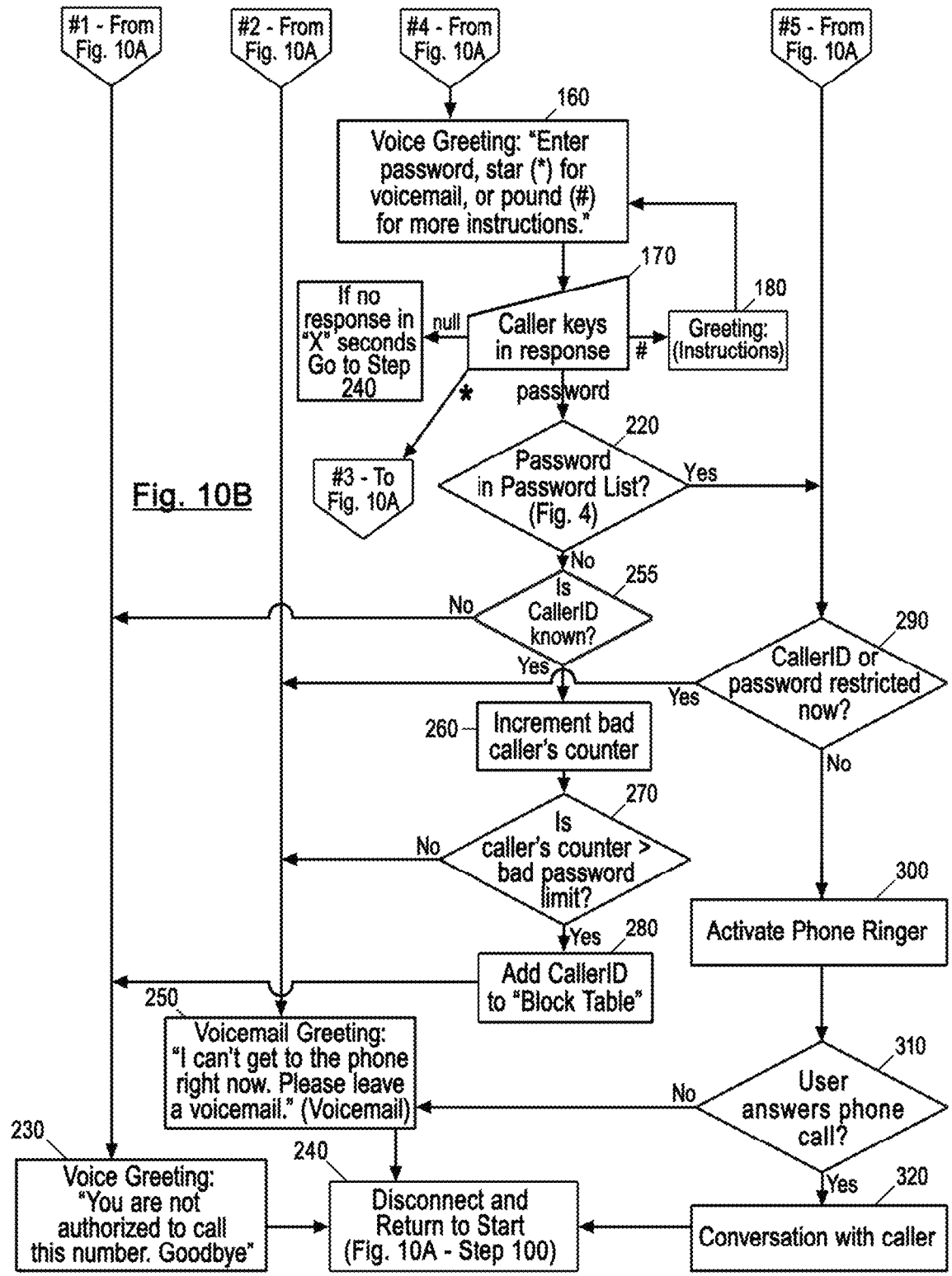

In some non-limiting embodiments or examples, when executed on user smartphone 11, the application can program or configure user smartphone 11, in particular the processor 1 of user smartphone 11, to execute the method shown in the flow diagram of FIG. 10A-10B.

Referring to the flow diagram of FIGS. 10A-10B, upon startup, the processor 1 of user smartphone 11, operating under the control of the application stored in the memory subsystem 5 of user smartphone 11, causes the method to begin or initialize at start step 100 and advance to step 105. In step 105, the method causes the processor 1 of user smartphone 11 to monitor an RF transceiver of the connectivity subsystem 2 of user smartphone 11 for an incoming cellular telephone call from, for example, the remote smartphone 11' via a telephone service provider 10, e.g., a cellular telephone service provider. If an incoming cellular telephone call is not received at step 105, the method loops on step 105 until an incoming cellular telephone call is received by the RF transceiver of the connectivity subsystem 2 of user smartphone 11.

Upon the receipt of an incoming cellular telephone call by the RF transceiver of the connectivity subsystem 2 from remote smartphone 11', the method advances to step 110. In step 110, the method determines whether an incoming CallerID is associated with, included with, or modulated on the incoming cellular telephone call.

If no incoming CallerID is associated with, included with, or modulated on the incoming cellular telephone call, (e.g. the incoming cellular telephone call is "Unknown", "Anonymous", "Restricted" or the CallerID is otherwise unavailable), the method advances to step 115. If, however, in step 110 the method determines that an incoming CallerID is associated with, included with, or modulated on the incoming cellular telephone call, the method advances to step 120.

In step 120, the method compares the incoming CallerID to one or more CallerIDs included in a Block Table (FIG. 6) stored in the memory subsystem 5 of user smartphone 11. In the event of a match in step 120, i.e., the incoming CallerID matches a CallerID in the Block Table (FIG. 6), the method to advances to step 230 where a voice greeting or message, e.g., "You are not authorized to call this number. Goodbye." is returned to remote smartphone 11' and then advances to step 240 where the call is disconnected and the method returns to step 100 and then step 105.

Cascading Lists

In step 130, the method compares the incoming CallerID to one or more CallerIDs included in a Contact List or Contact Phone table (FIG. 11) which may be stored in the memory subsystem 5 of user smartphone 11. In the event of a match in step 130, i.e., the incoming CallerID matches a CallerID in the Contact List (FIG. 11), method advances to step 290. However, in the event of no match in step 130, i.e., the incoming CallerID does not match a CallerID in the Contact List (FIG. 11), the method advances to optional step 135.

In optional step 135, the method compares "N" digits of the incoming CallerID to "N" digits of one or more "Wildcard" entries included in a Wildcard List (FIG. 12) stored in the memory subsystem 5 of user smartphone 11. In the event of a match in step 135, i.e., the incoming CallerID matches a "Wildcard" in the Wildcard List, the method advances to step 290. However, in the event of no match in step 135, i.e., the incoming CallerID does not match a "Wildcard" in the Wildcard List, the method advances to optional step 140.

If use of the Wildcard List is enabled, it allows callers to be authorized to activate the user notification means of the user smartphone 11 based on, for example, the first "N" digits of the incoming CallerID. This can be used to authorize calls having different CallerIDs, but with the same first "N" digits, which might all be in the same complex—like a hospital, where the user would want, for example, a call from a patient's room phone, even if they switch rooms, to activate the user notification means of the user smartphone 11. Likewise, the nursing station, ER, doctors, and billing of the hospital having different CallerIDs, but with the same first "N" digits, may be authorized to activate the user notification means of the user smartphone 11 by employing the Wildcard List.

In optional step 140, the method compares the incoming CallerID to one or more CallerIDs included in a Previously Dialed List (FIG. 13) stored in the memory subsystem 5 of user smartphone 11. In the event of a match in step 140, i.e., the incoming CallerID matches a CallerID in Previously Dialed List, the method advances to step 290. However, in the event of no match in step 140, i.e., the incoming CallerID does not match a CallerID in the Previously Dialed List, the method advances to optional step 150.

If use of the Previously Dialed List is enabled, the user notification means of the user smartphone 11 may be activated by a call received from a phone, e.g., remote smartphone 11', that has associated with, included with, or modulated thereon a phone number that the user smartphone 11 has previously called and/or texted and/or attempted to call and/or text.

In optional step 150, the method compares the incoming CallerID to one or more CallerIDs included in an Entered Password List (FIG. 14) stored in the memory subsystem 5 of user smartphone 11. In the event of a match in step 150, i.e., the incoming CallerID matches a CallerID in the Entered Password List, the method advances to step 290. However, in the event of no match in step 140, i.e., the incoming CallerID does not match a CallerID in the Entered Password List, the method advances to step 160.

If the Entered Password List is active, the user notification means of the user smartphone 11 may be activated by a call received by the user smartphone 11 from a phone number, e.g., the phone number of remote smartphone 11', which has ever entered a correct password in the past.

In some non-limiting embodiments or examples, all of optional steps 135, 140 and 150 may be omitted from the method shown in FIGS. 10A-10B, whereupon, in the event of no match in step 130, the method may advance directly to step 160, as shown by dashed line 30 in FIG. 10A. In some non-limiting embodiments or examples, one or two or all of optional steps 135, 140 and 150 may be omitted from the method shown in FIGS. 10A-10B. Moreover, the order of optional steps 135, 140 and 150 shown in FIG. 10A is not to be construed in a limiting sense since it is envisioned that two or more or all of steps 135, 140 and 150 may be arranged in any order deemed suitable and/or desirable by one skilled in the art. For the purpose of description only, and not by way of limitation, the method will be described as including optional steps 135, 140 and 150. However, it is to be understood that if one or more or all of optional steps 135, 140 and 150 is/are omitted from the method, then the description herein of FIGS. 10A-10B would be modified accordingly.

In step 160, the method causes a Voice Greeting to be sent via the RF transceiver of the connectivity subsystem 2 of user smartphone 11 to the remote smartphone 11' via the telephone service provider 10 requesting entry of a password followed by a pound sign (#), or to enter a star (*) to go directly to voicemail, or to enter only a pound sign (#) for more instructions, whereupon the method advances to step 170. In step 170, the method may wait a period of time, e.g., "X" seconds, for a response to the Voice Greeting. If, in step 170, there is no response to the Voice Greeting with said period of time (referred to herein as "null"), the method (via the "null" decision from step 170) may advance to step 240.

However, when a response in step 170 entered into remote smartphone 11' is received by user smartphone 11 within said period of time, the response is transmitted following the entry of a pound sign (#), or a star (*) through the telephone service provider 10 back to the user smartphone 11 and received by the RF transceiver of the connectivity subsystem 2 and is transmitted to the processor 1. If the response in step 170 is star (*), the method advances to step 115. If the response in step 170 is pound (#), the method advances to step 180.

In step 180, the method may cause a Voice Greeting to be sent from the RF transceiver of the connectivity subsystem 2 of user smartphone 11 via the telephone service provider 10 to the remote smartphone 11' instructing, for example only, that "If the CallerID for your phone is deactivated (e.g. via *67) or if you are calling from another phone other than your own, you may use your area code and phone number as a password." Following step 180, the method may return to step 160. More generally, if, in step 170, only a pound sign (#) is entered, more detailed instructions may be given in a Voice Greeting (step 180) for entering an alternate password, e.g. the area code and phone number assigned to the remote smartphone 11'.

If, however, in step 170, the response is not star (*) or pound (#), whatever is entered into remote smartphone 11' is assumed by the method to be a password attempt and the application causes the method to advance to step 220.

In step 220, the method compares the digits in the password attempt received from the remote smartphone 11' to one or more passwords included in the Password List of FIG. 4 stored in the memory subsystem 5 of user smartphone 11. In the event of a match in step 220, i.e., the received password matches a password in the Password List (FIG. 4), the method advances to step 290. In the event of no match in step 220, i.e., received password attempt does not match a password in the Password List, the method advances to step 255.

In step 255, as in step 110, the application determines whether a CallerID is associated with, included with, or modulated on the incoming call. If no CallerID is associated with, included with, or modulated on the incoming call, (e.g. the incoming call is "Unknown", "Anonymous", "Restricted" or the CallerID is otherwise unavailable), the method advances to step 230. If, however, in step 255 the application determines that the incoming CallerID is available, the method advances to step 260.

In step 260, the method increments by 1 an "Invalid PASSWORD Counter" in the Contact List (FIG. 11) for the CallerID of the incoming call. Then, the method advances to step 270.

In step 270, the method compares the value of the "Invalid PASSWORD Counter" in the Contact List (FIG. 11) for the CallerID of the incoming cellular telephone call to a value included in a Bad_Password_Limit field of the Configuration Setup Table (FIG. 5). If the value of the Invalid PASSWORD Counter for the CallerID is less than the Bad_Password_Limit, then the method advances to step 250 where a greeting is sent the remote smartphone 11' to have the user thereof leave a voicemail. Otherwise the method advances to step 280.

In step 270, the method compares the value of the "Invalid PASSWORD Counter" in the Contact List (FIG. 11 for the CallerID of the incoming cellular telephone call to a value included in the Bad_Password_Limit field of the Configuration Setup Table (FIG. 5). If the value of the Invalid PASSWORD Counter for the CallerID is less than the value in the Bad_Password_Limit field, then the method advances to step 250 where a greeting is sent the remote smartphone 11' to have the user thereof leave a voicemail. Otherwise the method advances to step 280.

With regard to any step where the method advances to step 115, in step 115 the method obtains the value or entry in the "Block_Anon_Password" field of the Configuration Step table of FIG. 5. Herein, "Anon" is short for "Anonymous".

If the value or entry is "No", the method advances from step 115 to step 190. Otherwise the method advances to step 160. In step 115, the method determines whether an anonymous caller is permitted to enter a password to activate the user notification means of the user smartphone 11.

With regard to any prior step where the method advances to step 190, in step 190 the method obtains the value or entry in the "Block_Anon_VM" field of the Configuration Step table of FIG. 5. If the value or entry is "No", then t the method advances to step 200. Otherwise, the method advances to step 250. In steps 190 and 200, the method determines whether to block or to permit voicemails received from incoming calls where no CallerID exists.

In step 200, a Voice Greeting is sent the RF transceiver of the connectivity subsystem 2 via the telephone service provider 10 to the remote smartphone 11', stating, in an example, "Anonymous voicemail not currently allowed", whereafter the method advances to step 210, which terminates the call and then returns to step 100 and then to step 105 where the method waits for the next incoming call.

With regard to any prior step where the method advances to step 230, a Voice Greeting is sent via the RF transceiver of the connectivity subsystem 2 of user smartphone 11 and the cellular telephone service provider 10 to remote smartphone 11', stating, in an example: "You are not authorized to call this number. Goodbye", whereafter the method advances to step 240, which terminates the call and then returns to step 100 and then step 105 where the method waits for the next incoming call.

With regard to any prior step where the method advances to step 290, a Customized Temporary Restriction (described next) may be executed or implemented by the method to determine whether or not to activate the user notification means of the user smartphone 11.

Customized Temporary Restriction

The Customized Temporary Restriction of step 290 enables a call from remote smartphone 11' to activate the user notification means of user smartphone 11 at desired times.

Managing Caller Categories

A call from remote smartphone 11' having a CallerID in the Contact List (FIG. 11) that is also listed the Contact Data Table (FIG. 7) may be authorized or restricted from activating the user notification means of user smartphone 11 explicitly, or by assigning the Caller Category field of the Category List (FIG. 3) to that caller via the Contact ID and Category ID fields of the Contact Category Table (FIG. 15).

Each caller in the Contact List (FIG. 11) may have one or more "Caller Categories" assigned in the Category List (FIG. 3) via the Contact Data Table (FIG. 7) and the Contact Category Table (FIG. 11). By way of the method querying Contact List (FIG. 11) for the incoming CallerID="CallerID/Phone #", and retrieving the "Contact ID", then query the Contact Category Table of FIG. 15 with that "Contact ID" for all matching or corresponding "Contact ID". Then, for each corresponding "Category ID" in FIG. 15 for that "Contact ID", the method queries the Category List table (FIG. 3) to retrieve the "Auth?" flag for each related "Category ID". Only when the method determines that all of the "Auth?" flags associated with a call are "1", will that caller be authorized by the method at this moment in time to activate the user notification means of the user smartphone 11.

For example, if an incoming CallerID is also in the Contact List (FIG. 11) at this point in time, and if the incoming CallerID is assigned a Caller Category: "Polo Team" from the Category List (FIG. 3) via the Contact IDs of the table or list of FIG. 7 (Contact Data Table) and the Category ID of FIG. 15 (Contact Category Table), then the method queries Contact List (FIG. 11) with the incoming "CallerID/Phone #" and retrieves the "Contact ID", then queries the Contact Category Table (FIG. 15) with that "Contact ID" for any/all matching or corresponding "Category ID" records. Then, for each "Category ID" retrieved from the Contact Category Table (FIG. 15) for that "Contact ID", the method queries the Category List Table (FIG. 3) to retrieve the "Auth?" flag for each related "Category ID". In this example, the only Caller Category assigned to this call was: "Polo Team" and "Polo Team" was temporarily restricted from acceptance by the user in FIG. 3 ("Auth?" field for "Polo Team" set to "0"), then the method advances to step 250 where the user smartphone 11 would output a voicemail to the remote smartphone 11. Otherwise the method would advance to step 300 where the user notification means of the user smartphone 11 would be activated.

In step 290, whether authorized by using the CallerID of the incoming call (from step 130, or step 135, or step 140, or step 150), or whether authorized by the caller entering a valid password from step 220, in step 290, the method then determines:

1. If the value of the "Auth?" field=0 in FIG. 7 (i.e. if a caller (via a Contact ID (FIG. 7) associated with an incoming call has been temporarily restricted from activating the user notification means of the user smartphone 11)—or
2. If the value of the "Auth?" field=0 in FIG. 3 (i.e. if the Caller Category (FIG. 3) of the incoming call has been temporarily restricted from activating the user notification means of the user smartphone 11)—or
3. If the value of the "Auth?" field=0 in FIG. 4 (i.e. if the password (FIG. 4) the caller entered has been temporarily restricted from activating the user notification means of the user smartphone 11)—or
4. If the value of the "Auth?" field=0 in FIG. 12 (i.e. where the first "N" digits of the CallerID of the incoming call matches an entry in the "Wildcard" field (FIG. 12), temporarily restricting all those callers from activating the user notification means of the user smartphone 11)—or
5. If the value of the "Auth?" field=0 in FIG. 13 (i.e. where the CallerID of the incoming call matches the CallerID/Phone # in this "Previously Dialed List" (FIG. 13) temporarily restricting incoming calls from numbers the user has ever dialed from activating the user notification means of the user smartphone 11).

If any of these comparisons 1-5 above determines the value of the "Auth?" field to be =0, then the method advances from step 290 to step 250. Otherwise, the method advances from step 290 to step 300. In general, in step 290 a caller has already been authorized to activate the user notification means (e.g., ringer function) of the user smartphone 11. Step 290 allows temporary restrictions on activating the user notification means by caller category, by one or more individual numbers previously dialed by the user, by one or more Wildcards, by one or more individual passwords, or even by individual CallerID. Likewise, via the slider 20 in FIG. 2, each of the 5 lists may be temporarily restricted, giving the user control over who may activate the user notification means of the user smartphone 11 at any time.

In step 300, the user notification means of the user smartphone 11 is activated. User smartphone 11 may display the CallerID, if available, that may be associated with, included with, or modulated on the incoming call and, optionally, the reason that call was cleared or permitted to activate the user notification means of the user smartphone 11 (e.g. "From Business Card"), and the user of user smartphone 11 may decide in step 310 whether to answer the call and have a conversation with the caller in step 320, or not answer the call whereupon user smartphone 11 advances to step 250, whereupon the remote smartphone 11' is prompted with a voicemail greeting to leave a voicemail.

Following step 250 (i.e., following receipt of a voicemail from remote smartphone 11') and/or step 320 (when an indication is received by user smartphone 11 or remote smartphone 11' to terminate the call), the method advances to step 240, which disconnects the call between the user smartphone 11 and the remote smartphone 11' and returns to step 100 and then to step 105 where the method will wait for user smartphone 11 to receive another incoming call.

With regard to any step where the method advances to step 250, once a voicemail is received, e.g., at telephone service provider 10, the method advances to step 240, which disconnects the call between the user smartphone 11 and the remote smartphone 11' phone and advances to step 100 and then step 105 where the method will wait for the next incoming call to smartphone 11.

Text Acceptance Method

In some non-limiting embodiments or examples, when executed on a smartphone, the application can program or configure user smartphone 11, particularly the processor 1 of user smartphone 11, to execute the method shown in the flow diagram of FIGS. 16A-16B. The description herein of the application being used for the Call Acceptance Method shown in FIGS. 10A-10B and the Text Acceptance Method shown in FIGS. 16A-16B and described in detail hereinafter is not be construed in a limiting sense since it is envisioned that the Call Acceptance Method and the Text Acceptance Method may be implemented by separate applications.

With reference to the smartphone block diagram shown in FIG. 1 and the flow diagram shown in FIGS. 16A-16B, upon startup, the processor 1 of user smartphone 11, operating under the control of an application stored in the memory subsystem 5, initializes the method at start step 400 and advances to step 405. In step 405, the method causes the processor 1 of the smartphone 11 to monitor the RF transceiver of the connectivity subsystem 2 of user smartphone 11 for an incoming text message via telephone service provider 10, e.g., a cellular telephone service provider. If an incoming text message is not received at step 405, the method causes the processor 1 to loop on step 405 until an incoming text message is received by the RF transceiver of the connectivity subsystem 2 of user smartphone 11.

Upon the receipt of an incoming text message by the RF transceiver of the connectivity subsystem 2, the method causes the processor 1 to advance to step 410. In step 410, the method determines whether an incoming CallerID is associated with, included with, or modulated on the incoming text message. If not, (e.g. the incoming text message is "Unknown", "Anonymous", "Restricted" or the CallerID is otherwise unavailable), the method advances to step 490. If, however, in step 410 the application determines that an incoming CallerID is available, the method advances to step 420.

In step 420, the method compares the incoming CallerID to one or more CallerIDs stored in the Block Table (FIG. 6) stored in the memory subsystem 5 of smartphone 11. In the event of a match in step 420, i.e., the incoming CallerID matches a CallerID in the Block Table (FIG. 6), the method advances to step 530. In the event of no match in step 420, i.e., the incoming CallerID does not match a CallerID in the Block Table (FIG. 6), the method advances to step 430.

Cascading Lists

In step 430, the method compares the incoming CallerID to one or more CallerIDs included in the Contact List or Contact Phone table (FIG. 11) stored in the memory subsystem 5 of user smartphone 11. In the event of a match in step 430, i.e., the incoming CallerID matches a CallerID in the Contact List (FIG. 11), the method advances to step 600. In the event of no match in step 430, i.e., the incoming CallerID does not match a CallerID in the Contact List (FIG. 11), the method advances to optional step 435.

In optional step 435, the method compares "N" digits of the incoming CallerID to "N" digits of one or more "Wildcard" entries included in the Wildcard List (FIG. 12) stored in the memory subsystem 5 of smartphone 11. In the event of a match in step 435, i.e., the incoming CallerID matches a "Wildcard" in the Wildcard List, the method advances to step 600. In the event of no match in step 435, i.e., the incoming CallerID does not match a "Wildcard" in the Wildcard List, the method advances to optional step 440.

If use of the Wildcard List enabled, it allows texters to be authorized to text the user smartphone 11 based on, for example, the first "N" digits of the incoming CallerID. This can be used to authorize texts having different CallerIDs, but with the same first "N" digits, which might all be in the same complex—like a hospital, where the user would want, for example, a text message from a nursing station, ER, doctors, or billing—to be able to delivered to the user smartphone 11 for display on a display of the display subsystem 4.

In optional step 440, the method compares the incoming CallerID to one or more CallerIDs included in the Previously Dialed List (FIG. 13) stored in the memory subsystem 5 of user smartphone 11. In the event of a match in step 440, i.e., the incoming CallerID matches a CallerID in the Previously Dialed List, the method advances to step 600. In the event of no match in step 440, i.e., the incoming CallerID does not match a CallerID in the Previously Dialed List, the method advances to optional step 450.

If use of the Previously Dialed List is enabled, one or more text messages may be delivered for display on a display of user smartphone 11 from a phone, e.g., remote smartphone 11', that has associated with, included with, or modulated thereon a phone number that the user smartphone 11 has previously called and/or texted and/or attempted to call and/or text.

In optional step 450, the method compares an incoming CallerID to one or more CallerIDs included in the Entered Password List (FIG. 14). In the event of a match in step 450, i.e., the incoming CallerID matches a CallerID in the Entered Password List, the method advances to step 600. In the event of no match in step 440, i.e., the incoming CallerID does not match a CallerID in the Entered Password List, method advances to step 470.

In some non-limiting embodiments or examples, any or all of optional steps 435, 440 and 450 may be omitted from the method shown in FIGS. 16A-16B, whereupon, in the event of no match in step 430, the application may cause the method to advance directly to step 470, as shown by dashed line 32 in FIG. 16A. In some non-limiting embodiments or examples, one or two of optional steps 435, 440 and 450 may be omitted from the method shown in FIGS. 16A-16B. Moreover, the order of optional steps 435, 440 and 450 shown in FIG. 16A is not to be construed in a limiting sense since it is envisioned that two or more or all of steps 435, 440 and 450 may be arranged in any order deemed suitable and/or desirable by one skilled in the art. For the purpose of description only, and not by way of limitation, the method will be described as including optional steps 435, 440 and 450. However, it is to be understood that if one or more or all of optional steps 435, 440 and 450 is omitted from the method, then the description herein of FIGS. 16A-16B would be modified accordingly.

In step 470, since the incoming CallerID did not produce a match in steps 430, 435, 440 and 450, the method in step 470 analyzes the content of the text message to determine or identify if one or more characters (letters and/or numbers and/or tokens) reside at one or more predetermined locations or positions in the text message body, e.g., the first word, string, or token of the text body, whereafter the method advances to step 520. In some non-limiting embodiments or examples, the one or more predetermined locations or positions may include one or more characters (e.g., a string of characters) at a first location or position, or a last location or position, or at any other location or position in the text message body.

In step 520, the method compares the one or more characters determined in step 470 to one or more Passwords included in the Password List (FIG. 4) for a match. In the event of a match in step 520, i.e., the one or more characters determined in step 470 match a Password in the Password List, the method advances to step 600. In the event of no match in step 520, i.e., one or more characters determined in step 470 do not match a Password included in the Password List, the method advances to step 555.

In step 555, as in step 410, the method determines whether an incoming CallerID is associated with, included with, or modulated on the incoming text message. If not (e.g. the incoming text message is "Unknown", "Anonymous", "Restricted" or the CallerID is otherwise unavailable), the method advances to step 530. If, however, in step 555 the application determines that the incoming CallerID is associated with, included with, or modulated on the incoming text message, the method advances to step 560.

In step 570, the method compares the value of the "Invalid PASSWORD Counter" of the Contact List (FIG. 11) for the incoming CallerID of the incoming text message with the value included in the "Bad_Password_Limit" field of the Configuration Setup Table (FIG. 5).

If the value of the "Invalid PASSWORD Counter" of the Contact List (FIG. 11) associated with the incoming CallerID is less than the value included in the "Bad_Password_Limit" field of the Configuration Setup Table (FIG. 5), the method advances to step 550. Otherwise, the method advances to step 580.

In step 580, the method adds to the "Block Table" of FIG. 6 a record that includes under the heading "CallerID/Phone #" in FIG. 6 the incoming CallerID of the incoming text message; includes under the heading "Date/Time Blocked" the current date/time stamp; and includes under the heading "Description" the message "Auto-blocked by Method". Steps 560-580 are used to avoid a hacker from texting repeatedly and trying to guess a correct password.

With regard to any step where the method advances to step 490, in step 490 the method obtains the value or entry in the "Block_Anon_Texts" field of the Configuration Setup (FIG. 5).

If this value or entry is "Yes", then the method advances from step 490 to step 470. Otherwise, when this value or entry is "No", the method advances to step 500. In steps 490 and 500, the method determines whether to block or permit texts received from incoming text messages that do not include an incoming CallerID.

In step 500, the method causes an Auto-return Text to be sent from the user smartphone 11 via the RF transceiver of the connectivity subsystem 2 to the phone, e.g., the remote smartphone 11', from which the incoming text is step 405 was received via telephone service provider 10, stating, for example: "Anonymous texting is not currently permitted". Then, the method advances to step 510, which returns to step 400 and then to step 405 where the method waits for the next incoming text. In step 500, the user of remote smartphone 11' is informed via the "Auto-return Text" that anonymous texts are not currently allowed.

With regard to any step where the application causes the method to advance to step 530, in step 530 an Auto-return Text is sent via the RF transceiver of the connectivity subsystem 2 of user smartphone 11 to the phone, e.g., the remote smartphone 11', from which the incoming text is step 405 was received via the telephone service provider 10, stating, for example: "You are not authorized to send text messages to this phone number". Then the application causes the method to advance to step 540, which returns the method to step 400 and then to step 405 where the method waits for the next incoming text.

With regard to any step where the method advances to step 550, in step 550 an Auto-return Text is sent via the RF transceiver of the connectivity subsystem 2 of user smartphone 11 to the remote smartphone 11' via the telephone service provider 10, stating, in an example: "Please re-send text message with a correct password as the first word of your text". Other positions of the correct password in the body of the text (other than the first word) are envisioned. Then, the method advances to step 540, which returns to step 400 and then 405 where the method waits for the next incoming text.

With regard to any step where the method advances to step 600, in step 600 the text is authorized and the method activates the user notification means of or associated with the user smartphone 11. In this example, the user notification means of the user smartphone 11 may be a display of or accessible to the user smartphone 11 where the text is displayed. In step 600, the incoming CallerID of the incoming text message, if available, may also be displayed on the display, and, optionally, the reason that text has arrived (e.g. "From Business Card") may be displayed on the display. Following step 600 the method advances to step 540, which returns to step 400 and then to step 405 where the method waits for the next incoming text.

As can be seen, disclosed herein is a method comprising: (a) receiving, by a first call handling device 11, via a service provider 10, a call including an identification code (CallerID/Phone #) associated with a second call handling device 11' initiating the call, wherein each call handling device includes one or more processors and memory; (b) determining, by the first call handling device 11, if there is a match between the identification code (CallerID/Phone #) included with the call and a previously recorded identification code (CallerID/Phone #) available to the first call handling device 11; (c) in response to determining no match in step (b), causing the first call handling device 11 to not activate a user notification means 3 and/or 4 of the first call handling device 11 and causing the second call handling device 11' to receive an audio prompt requesting entry of a passcode (Password (FIG. 4)) into the second call handling device; (d) receiving, by the first call handling device 11, the passcode entered into the second call handling device 11' in response to step (c); (e) determining, by the first call handling device 11, if there is a match between the passcode received in step (d) and a previously recorded passcode (Password (FIG. 4)) available to the first call handling device 11; and (f) in response to determining a match in step (e), the first call handling device 11 activating the user notification means 3 and/or 4 of the first call handling device 11.

Also disclosed herein is a method comprising: (a) receiving, by a first text message handling device 11 via a service provider 10, a first text message including an identification code (CallerID/Phone #) associated with a second text message handling device 11' initiating the first text message, wherein each text message handling device includes one or more processors and memory; (b) determining, by the first text message handling device, if there is a match between the identification code (CallerID/Phone #) included with the first text message and a previously recorded identification code (CallerID/Phone #) available to the first text message handling device 11; (c) in response to determining no match in step (b), causing the first text message handling device to not display the first text message and causing the second text message handling device to receive a second text message requesting inclusion of a passcode (Password (FIG. 4)) in the first text message; (d) receiving, by the first text message handling device 11 from the second text message handling device 11', a third text message including the first text message and the passcode entered at the second message text handling device in response to step (c); (e) determining, by the first text message handling device 11, if there is a match between the passcode included in third text message received in step (d) and a previously recorded passcode (Password (FIG. 4)) available to the first text message handling device 11; and (f) in response to determining a match in step (e), the first text message handling device causing the third text message to be displayed on a display.

Finally, disclosed herein is a method comprising: (a) receiving by a first electronic device 11 from a second electronic device 11' an electronic communication (a call or text message) having an identification code (CallerID/Phone #) associated with, included with, or modulated on the electronic communication, wherein each electronic device includes a processor and memory and the electronic communication is transmitted via a wired, a wireless, or both a wired and a wireless communication medium (service provider 10); (b) determining, by the first electronic device 11, if there is a match between the identification code associated with, included with, or modulated on the electronic communication and a previously recorded identification code available to the first call handling device 11; (c) in response to determining no match in step (b), causing the first electronic device 11 to not activate a user notification means 3 and/or 4 of the first electronic device 11 and causing the second call handling device 11' to receive a prompt requesting entry of a passcode (Password (FIG. 4)) into the second electronic device; (d) receiving, by the first electronic device 11, the passcode entered into the second electronic device in response to step (c); (e) determining, by the first electronic device, if there is a match between the passcode received in step (d) and a previously recorded passcode (Password (FIG. 4)) available to the first electronic device 11; and (f) in response to determining a match in step (e), the first electronic device 11 activating the user notification means 3 and/or 4 of the first electronic device 11.

The claimed invention improves on existing methods for call/text blocking/acceptance by requiring the remote smartphone 11' to provide a password to the user smartphone 11 or the server of the telephone service provider 10 as a condition to the user notification means of the user smartphone 11 being activated. From a system architecture perspective, the claimed invention avoids the need for a third-party, other than the telephone service provider 10 which is already part of a call/text transaction between the user smartphone 11 and the remote smartphone 11', to block/allow a call/text from the remote smartphone 11' from activating the user notification means of the user smartphone 11. The present invention also allows a current call/text to activate the user notification means of the user smartphone 11 without the need to enter a password if certain conditions are met, e.g., if an acceptable password was provided for a prior call/text having associated with, included with, or modulated thereon a phone number/CallerID that is also associated with, included with, or modulated on a current call/text. This arrangement does not currently exist and provides the technical advantage of allowing or blocking a call/text from activating the user notification means of the user smartphone 11 while allowing users of the user smartphone 11 and the remote smartphone 11' to have control over the process, e.g., in real time or substantially real time during a call or text exchange. The present invention also or alternatively enables a user of user smartphone 11 to manage which calls/texts may activate the user notification means of the user smartphone 11 at a point in time, e.g., during a user selected period of time.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method comprising:
   (a) receiving, by a first call handling device, via a service provider, a call including an identification code associated with a second call handling device initiating the call, wherein each call handling device includes one or more processors and memory;
   (b) determining, by the first call handling device, if there is a match between the identification code included with the call and a previously recorded identification code available to the first call handling device;
   (c) in response to determining no match in step (b), causing the first call handling device to not activate a user notification means of the first call handling device and causing the second call handling device to receive an audio prompt requesting entry of a passcode into the second call handling device;
   (d) receiving, by the first call handling device, the passcode entered into the second call handling device in response to step (c);
   (e) determining, by the first call handling device, if there is a match between the passcode received in step (d) and a previously recorded passcode available to the first call handling device; and
   (f) in response to determining a match in step (e), the first call handling device activating the user notification means of the first call handling device,
   wherein all or a portion of the identification code included with the call is compared for a match in step (b) with previously recorded identification codes included in a plurality of cascading lists, one list at time, wherein the plurality of cascading lists includes a contact list including identification codes and at least one of the following lists: a wildcard list including identification codes, a previously dialed list including identification codes, and an entered password list including identification codes, wherein:
   each identification code included in the contact list is one of a Caller ID or a phone number;
   each identification code included in the wildcard list is a portion of a phone number;
   each identification code included in the previously dialed list is a phone number that was previously dialed at the first call handling device; and
   each identification code included in the entered password list is a Caller ID or a phone number of a second call handling device in which was previously entered a passcode that matched a previously recorded passcode available to the first call handling device.

2. The method of claim 1, wherein steps performed by first call handling device are performed automatically by the first call handling device without input into the first call handling device by a user of the first call handling device.

3. The method of claim 1, further including:
   (g) in response to a user not answering the call in response to the activation of the user notification means in step (f), causing the second call handling device to receive a prompt to leave a voicemail.

4. The method of claim 3, further including:
   (h) in response to the prompt in step (g), the second call handling device receiving the voicemail; and
   (i) storing the voicemail received in step (h).

5. The method of claim 4, wherein the voicemail of step (i) is stored at the service provider.

6. The method of claim 1, wherein the previously recorded identification code available to the first call handling device in step (b) is stored in the memory of the first call handling device.

7. The method of claim 1, wherein the previously recorded identification code available to the first call handling device in step (b) is stored at the service provider.

8. The method of claim 1, wherein the previously recorded passcode available to the first call handling device in step (e) is stored in the memory of the first call handling device.

9. The method of claim 1, wherein the previously recorded passcode available to the first call handling device in step (e) is stored at the service provider.

10. The method of claim 1, wherein step (c) includes, in response to determining a match in step (b), causing the first call handling device to activate the user notification means of the first call handling device.

11. A method comprising:
    (a) receiving, by a first text message handling device via a service provider, a first text message including an identification code associated with a second text message handling device initiating the first text message, wherein each text message handling device includes one or more processors and memory;
    (b) determining, by the first text message handling device, if there is a match between the identification code included with the first text message and a previously recorded identification code available to the first text message handling device;
    (c) in response to determining no match in step (b), causing the first text message handling device to not display the first text message and causing the second text message handling device to receive a second text message requesting inclusion of a passcode in the first text message;
    (d) receiving, by the first text message handling device from the second text message handling device, a third text message including the first text message and the passcode entered at the second message text handling device in response to step (c);
    (e) determining, by the first text message handling device, if there is a match between the passcode included in third text message received in step (d) and a previously recorded passcode available to the first text message handling device; and
    (f) in response to determining a match in step (e), the first text message handling device causing the third text message to be displayed on a display,
    wherein all or a portion of the identification code included with the first text message is compared for a match in step (b) with previously recorded identification codes included in a plurality of cascading lists, one list at time, wherein the plurality of cascading lists includes a contact list including identification codes and at least one of the following lists: a wildcard list including identification codes, a previously dialed list including identification codes, and an entered password list including identification codes, wherein:

each identification code included in the contact list is one of a Caller ID or a phone number;

each identification code included in the wildcard list is a portion of a phone number;

each identification code included in the previously dialed list is a phone number that was previously dialed at the first text message handling device; and each identification code included in the entered password list is a Caller ID or a phone number of a second text message handling device in which was previously entered a passcode that matched a previously recorded passcode available to the first text message handling device.

12. The method of claim 11, wherein steps performed by first text handling device are performed automatically by the first text handling device without input into the first text handling device by a user of the first text handling device.

13. The method of claim 11, wherein the previously recorded identification code available to the first text handling device in step (b) is stored in the memory of the first text handling device.

14. The method of claim 11, wherein the identification code available to the first text handling device in step (b) is stored at the service provider.

15. The method of claim 11, wherein the previously recorded passcode available to the first text handling device in step (e) is stored in the memory of the first text handling device.

16. The method of claim 11, wherein the previously recorded passcode available to the first text handling device in step (e) is stored at the service provider.

17. The method of claim 11, wherein step (c) includes, in response to determining a match in step (b), causing the first text message handling device to activate the user notification means of the first text message handling device.

18. A method comprising:

(a) receiving by a first electronic device from a second electronic device an electronic communication having an identification code associated with, included with, or modulated on the electronic communication, wherein each electronic device includes a processor and memory and the electronic communication is transmitted via a wired, a wireless, or both a wired and a wireless communication medium;

(b) determining, by the first electronic device, if there is a match between the identification code associated with, included with, or modulated on the electronic communication and a previously recorded identification code available to the first electronic device;

(c) in response to determining no match in step (b), causing the first electronic device to not activate a user notification means of the first electronic device and causing the second electronic device to receive a prompt requesting entry of a passcode into the second electronic device;

(d) receiving, by the first electronic device, the passcode entered into the second electronic device in response to step (c);

(e) determining, by the first electronic device, if there is a match between the passcode received in step (d) and a previously recorded passcode available to the first electronic device; and (f) in response to determining a match in step (e), the first electronic device activating the user notification means of the first electronic device, wherein all or a portion of the identification code associated with, included with, or modulated on the electronic communication is determined for a match in step (b) with previously recorded identification codes included in a plurality of cascading lists, one list at time, wherein the plurality of cascading lists includes a contact list including identification codes and at least one of the following lists: a wildcard list including identification codes, a previously dialed list including identification codes, and an entered password list including identification codes, wherein:

each identification code included in the contact list is one of a Caller ID or a phone number;

each identification code included in the wildcard list is a portion of a phone number;

each identification code included in the previously dialed list is a phone number that was previously dialed at the first electronic device; and each identification code included in the entered password list is a Caller ID or a phone number of a second electronic device in which was previously entered a passcode that matched a previously recorded passcode available to the first electronic device.

19. The method of claim 18, wherein step (c) includes, in response to determining a match in step (b), causing the first electronic device to activate the user notification means of the first electronic device.

* * * * *